Patented Jan. 1, 1929.

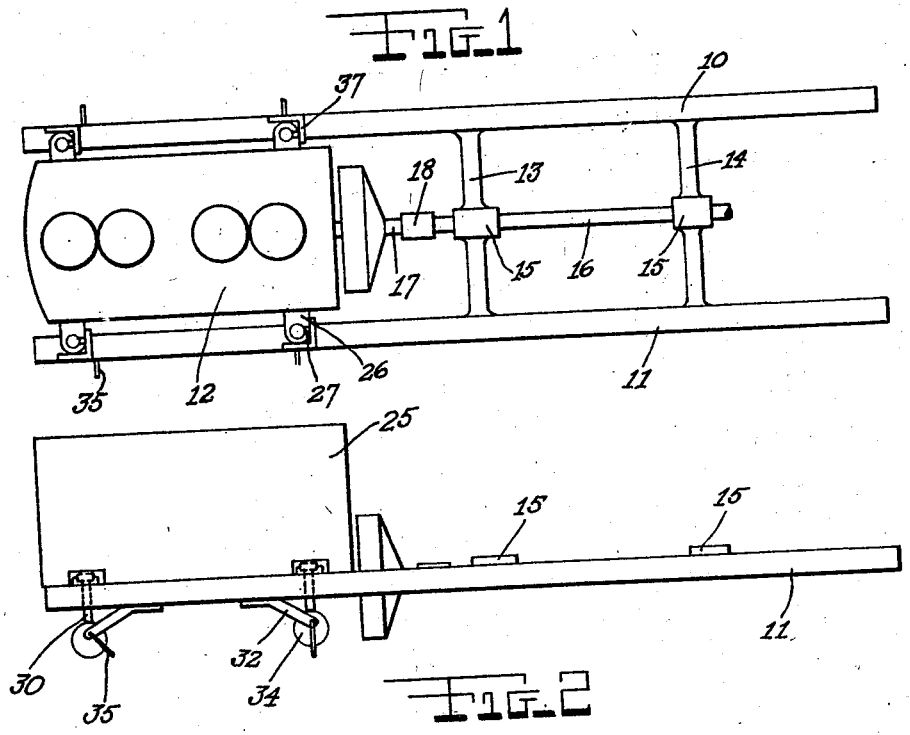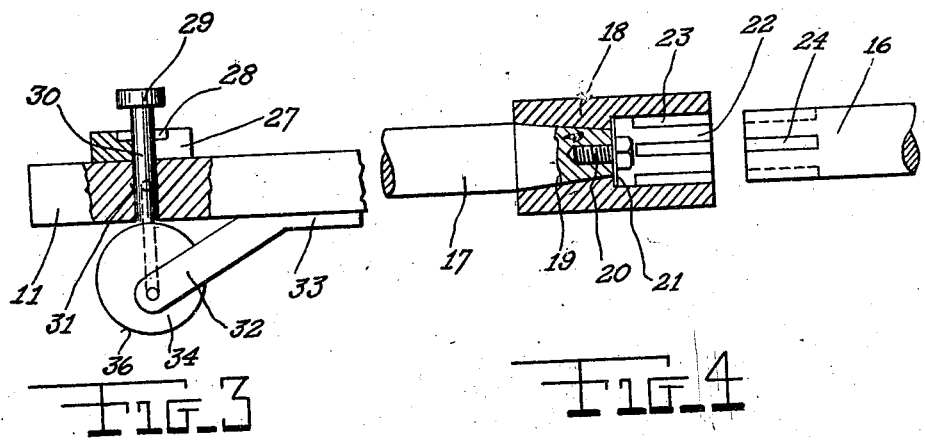

1,697,565

UNITED STATES PATENT OFFICE.

OTTO HORLACHER, OF NEWARK, NEW JERSEY.

REPLACEMENT ENGINE DEVICE.

Application filed October 19, 1927. Serial No. 227,205.

The main object of this invention is to provide an engine which may be coupled to an existing apparatus in a quick and convenient manner. The device is so constructed as to permit it to be used as an interchangeable engine power unit which may be transferred from one machine to another in a quick and convenient manner.

Another object of this invention is to provide a replacement unit in the form of an engine having means thereon for securely locking said engine unit in position upon the structure of the machine to which it is attached.

The above and other objects will become apparent in the description below, in which characters of reference refer to like-named parts in the drawing.

Referring briefly to the drawing, Figure 1 is a top plan view of the engine as mounted in place upon the chassis of a mobile vehicle.

Figure 2 is a side elevational view of the same.

Figure 3 is a fragmentary sectional view of the means provided for locking the engine unit in place on the chassis.

Figure 4 is a longitudinal sectional elevational view of the drive shaft and motor shaft in parted position showing the connection coupling mounted on one end of the engine shaft.

Referring in detail to the drawing, the numerals 10 and 11 indicate the side bars of a vehicle chassis. These bars extend throughout the length of the vehicle and are adapted to support a power unit, such as indicated by the numeral 12, and the entire body of the vehicle or such apparatus as is placed upon it. The device illustrated in this application is particularly adapted for use on vehicles which are used in construction work, such as cement mixers and winding drums or similar other apparatus. The bars 10 and 11 are connected at various positions by cross connecting arms 13 and 14 which, intermediate their length, are provided with sleeves 15 in which a drive shaft 16 is adapted to be journaled. The motor shaft 17 in the types of power units which are used with the aforesaid apparatus are connected by a coupling to the drive shaft 16 of the vehicle. The construction of the coupling comprises a sleeve 18 which is secured on the tapering end 19 of the shaft 17 by a bolt 20 which seats on a retaining washer 21. The sleeve 18 is provided with an annular socket 22 which receives the drive shaft 16. This sleeve socket has a plurality of ridges 23 formed therein which are adapted to be guided into longitudinal channels 24, fashioned on the end of the drive shaft 16. The engine unit 12 is located in a housing 25 which has ears 26 formed thereon which project from the side of the housing and rest upon the bars 10 and 11. These ears are provided with slots 27 which end blindly centrally of the ear and this blind terminating end has a sunken portion 28 into which the head 29 is received. The head 29 forms part of a bolt 30 which is circular in cross section and is slidably mounted in openings 31 in the bar 10 or 11. Beneath each one of these bolts 30 the angular arm 32 of a bracket 33 is positioned. This arm 32 rotatably supports an eccentric disc 34 which is connected to a crank 35 and the periphery 36 of the eccentric disc at all times supports the lower end of the bolt 30.

The motor unit is adapted to be conveniently shifted into place on the chassis frame bars 10 and 11 by being slid up to the obstructing brackets 37. The bolts 30 are permanently located slidably in the openings 31 of the frames and when the eccentric discs 34 are rotated to the position where they lift these bolts the diameters of these bolts are received into the slots 27 on the ears 26 as the engine unit is being slid into place. Simultaneously with the shifting of the engine unit into place the shaft 16 is projected into the coupling sleeve 18 and in this manner the drive shaft 16 and engine shaft 17 are mutually interlocked. By rotating the eccentric disc to the opposite position the bolts 30 are permitted to be lowered until the head 29 sinks into the well 28 formed in the ears, thereby locking the engine unit in place in such manner that it cannot shift in a horizontal plane through vibration or the like.

It is to be noted that certain changes in form and construction may be made without departing from the spirit and scope of the invention.

I claim:

1. A device of the class described comprising a frame having parallel bars, a housing having said engine unit therein, ears on said housing, said ears having slots therein terminating in a blind end, a sunken well at said blind terminating ends of said slots, and bolts slidable in said frame adapted to be lowered into said sunken well on said ears to lock said engine housing in place, and means for raising said bolts to permit said housing to be removed.

2. A device of the class described comprising a frame having parallel bars, a housing having said engine unit therein, ears on said housing, said ears having slots therein terminating in a blind end, a sunken well at said blind terminating ends of said slots, and bolts slidable in said frame adapted to be lowered into said sunken well on said ears to lock said engine housing in place, said bolts having heads thereon, the heads registering in said sunken wells of said ears, and discs mounted on said frames beneath said bolts for raising said bolts to the interlocked position.

3. A device of the class described comprising a frame having parallel bars, a housing having said engine unit therein, ears on said housing, said ears having slots therein terminating in a blind end, a sunken well at said blind terminating ends of said slots, and bolts slidable in said frame adapted to be lowered into said sunken well on said ears to lock said engine housing in place, said bolts having heads thereon, the heads registering in said sunken wells of said ears, and discs mounted on said frames beneath said bolts for raising said bolts to the interlocked position, said discs being eccentrically and rotatably mounted, the eccentric discs contacting with said bolts to raise the same when rotating, cranks integral with said eccentric discs, said bolts when raised projecting said heads of the bolts out of said wells to permit the bolts to slide through said slots when removing said engine housing.

In testimony whereof I affix my signature.

OTTO HORLACHER.